United States Patent [19]

Sanford et al.

[11] Patent Number: 4,646,177
[45] Date of Patent: Feb. 24, 1987

[54] AUTOMATIC TAPE THREADING SYSTEM FOR USE IN A TAPE TRANSPORT SYSTEM

[75] Inventors: Platter Sanford, Boulder; Larry R. Gadsby, Littleton; Robert T. Heath, Denver, all of Colo.

[73] Assignee: Electronic Processors, Inc., Englewood, Colo.

[21] Appl. No.: 554,934

[22] Filed: Nov. 25, 1983

[51] Int. Cl.⁴ .................... G11B 15/66; G03B 1/04
[52] U.S. Cl. ................................ 360/95; 242/195
[58] Field of Search ............... 242/195, 76; 226/91, 226/92, 198, 196; 352/157, 158; 360/93, 95, 130.2–130.23

[56] References Cited

U.S. PATENT DOCUMENTS

| | | | |
|---|---|---|---|
| 3,136,464 | 6/1961 | Schmid | 226/91 |
| 3,281,040 | 10/1966 | Grant | 226/97 |
| 3,598,926 | 8/1971 | Umeda | 179/100.2 |
| 3,799,422 | 3/1974 | Matsumoto | 226/196 |
| 3,848,263 | 11/1974 | Nagaoka | 360/83 |
| 3,912,144 | 10/1975 | Arsenealt et al. | 226/3 |
| 4,182,472 | 1/1980 | Peekna | 226/97 |
| 4,335,852 | 6/1982 | Cranna | 242/195 |
| 4,399,936 | 8/1983 | Rueger | 226/92 |
| 4,432,508 | 2/1984 | Inoue et al. | 242/195 |
| 4,479,158 | 10/1984 | Froelich et al. | 360/130.1 |
| 4,520,970 | 6/1985 | Rasmussen et al. | 242/195 |

Primary Examiner—Stuart N. Hecker
Assistant Examiner—Benjamin E. Urcia
Attorney, Agent, or Firm—Donald W. Margolis

[57] ABSTRACT

A small, high performance magnetic tape transport system for use in recording and reproducing data is adapted to receive a cartridge in which a single supply reel for the magnetic tape medium and the magnetic tape are carried. The cartridge is capable of being easily loaded into the transport system for recording (writing) and reproducing (reading), and is also easily ejected from the system for storage or replacement. A driving mechanism for the reel in the cartridge and a permanent take-up reel or hub are carried by the transport. The separate cartridge driving mechanism and take-up hub are each driven by their own separate motor system. In the embodiment disclosed, means are taught for automatic threading of the tape using a semi-rigid leader having a coupling portion attached to the take-up hub, the to-be-threaded tape including a complimentary coupling portion. The transport system defines a specific path for the leader to follow from the take-up hub so that it will reach and automatically couple with the tape and then be rewound on the take-up hub. However, a different path is followed by the tape.

10 Claims, 24 Drawing Figures

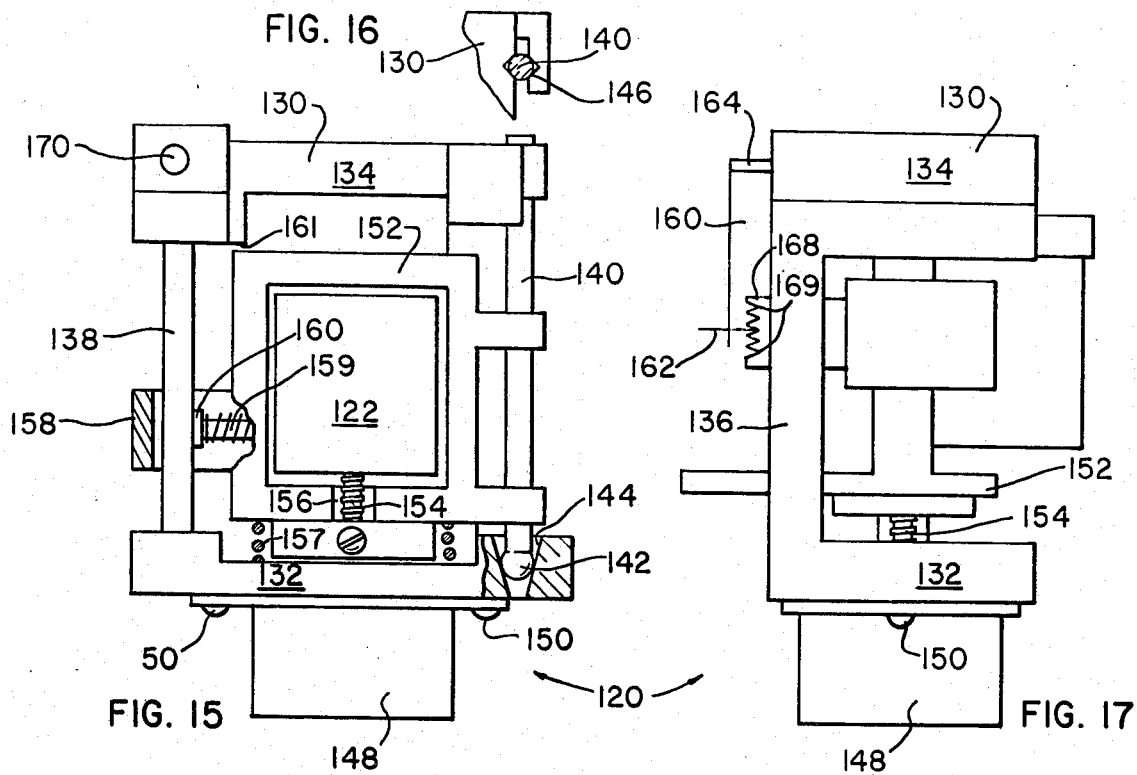
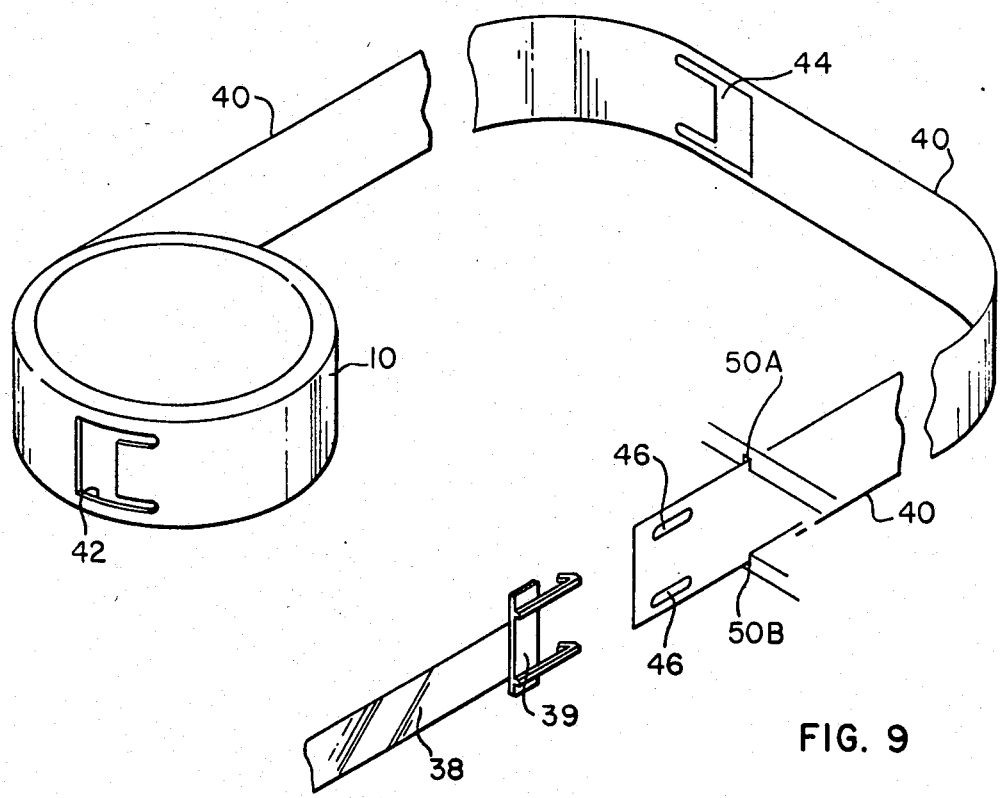

AUTOMATIC TAPE THREADING SYSTEM FOR USE IN A TAPE TRANSPORT SYSTEM

SUMMARY OF THE INVENTION

The present invention provides a small, high performance magnetic tape transport system for use in recording and reproducing data. In preferred embodiments, the supply reel for the magnetic tape medium and the tape is carried in a pack or cartridge which is capable of being easily loaded into the transport system for recording (writing) and reproducing (reading), and which cartridge is also easily removed from the system for storage. A take-up reel or hub is permanently carried by the transport. In the embodiment disclosed, means are included for loading, automatically positioning and seating a cartridge in contact with a drive mechanism in the transport, and for ejecting a cartridge therefrom. The separate cartridge drive and take-up hub are each driven by their own separate motor system in either a counter-clockwise or clockwise direction, as required, with the direction and speed of each motor being interrelated, as set forth in greater detail herein.

Automatic threading of the tape is provided. As disclosed in detail herein, the system includes a tape take-up hub, which hub includes a permanently attached semi-rigid leader including a coupling portion, while the to-be-threaded magnetic tape includes a complimentary coupling portion. The transport system defines a specific path for the leader to follow from the take-up hub so that it will reach and automatically couple with the tape, and then be rewound on the take-up hub. However, a different path is followed by the tape, which tape path places the tape in bearing-guiding system contact with associated transport mechanisms which provide for low friction and low sticktion between the tape, the tape bearing-guiding system and the transducer over which the tape traverses. As used herein and in this art, the term "sticktion" means the phenomenon of tape adhering to transport components such as heads or guides. The system also provides for accurate tape edge guiding without tape edge damage. The speed of rotation of the take-up hub is controlled by a tachometer located in the take-up hub, while the relative speed of both motors is controlled by a servo-system, all of which is detailed herein.

A magnetic transducer is positioned adjacent the tape path to record on and/or reproduce data from the magnetic tape medium. The present invention contemplates reading and recording high-density data on the tape in a plurality of serpentine parallel tracks, say twenty or more, using an inexpensive magnetic transducer having a small number of tracks. In order to achieve this multi-track format a system for both precisely positioning the head tracks and for quickly and accurately moving the head across the tape surface from track-to-track is provided.

These and other objects of the present invention will become apparent to those skilled in the art from the following detailed description, showing the novel construction, combination, and arrangement of parts as herein described, and more particularly defined by the appended claims, it being understood that such changes in the precise embodiments of the herein disclosed invention are meant to be included as come within the scope of the claims except insofar as precluded by the prior art.

BRIEF DESCRIPTION OF THE DRAWINGS

The accompanying drawings illustrate complete preferred embodiments of the present invention according to the best mode presently devised for the particular application of the principles thereof, and in which:

FIG. 9 is an enlarged schematic perspective view showing details of the tape-up hub, leader and tape;

FIG. 15 is a front plan view of the head positioning system of the present invention;

FIG. 16 is a top elevational view of a portion of the system of FIG. 15;

FIG. 17 is a side elevational view of the head positioning system of FIG. 15.

DETAILED DESCRIPTION OF THE INVENTION

Figure 1:
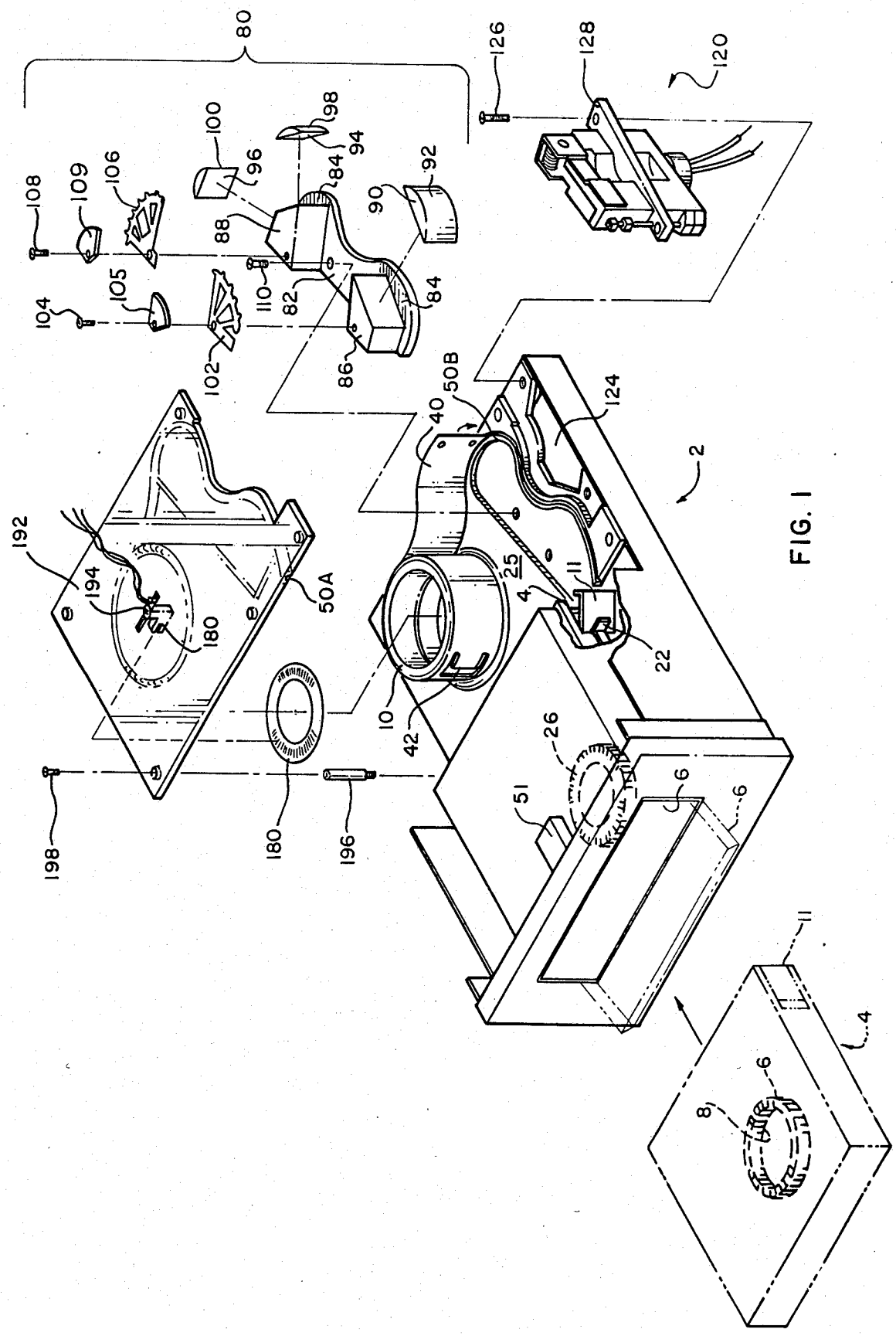
FIG. 1 is an exploded perspective, schematic view of the present invention, with some parts broken away.

For an initial understanding of the present invention, attention is first directed to FIG. 1 which sets forth a perspective, schematic, exploded view of the mechanisms of interest in the present invention. In general, the transport system 2 is designed to accept a magnetic tape cartridge 4, one cartridge 4 being shown in phantom outside of the transport and a portion of a cartridge shown positioned in the transport waiting to have tape threaded from it. Cartridge 4 is loaded through door 6, shown closed in FIG. 1 (and also shown open in phantom).

A take-up hub 10 having an attached leader 40 is located to receive tape 38 from cartridge 4. Leader 40 is semi-rigid, wider than tape 38, and is positioned to traverse threading path 50 defined by upper track 50A, shown in phantom, and lower track 50B. Tape 38 is narrower than the distance between tracks 50A and 50B. Once tape 38 is connected to leader 40 and threaded back toward take-up hub 10, it follows path 70 defined by bearing-guide assembly 80, and head positioning system 120 which path 70 is different from threading path 50. The speed of rotation of the take-up hub 10 is measured by tachometer 180, and that speed, as well as the tape tension is controlled by a motor servo-system as detailed below.

Tape Cartridge

Tape cartridge 4, is set forth in substantial additional detail in application Ser. No. 554,929 entitled "TAPE CARTRIDGE," filed herewith, by Charles A. Durand, et al. For purposes of this application, it is noted that cartridge 4 includes a central hub 6 terminating in an external drive spline 8, and also includes a swingably openable door 11 through which tape 38, which terminates in finger assembly 39, can exit cartridge 4.

Load and Eject

Referring now to FIGS. 2-6, the details of how cartridge 4 is loaded into and ejected from transport 2 are set forth with specificity.

A cartridge receiving chamber 12 exists within transport 2. Cartridge access to chamber 12 is gained only by first opening door 6 which is swingably mounted at its lower end by means of pivots 14 to the system housing. Extending at an angle at each side of the lower end of door 6 in the vicinity of pivot 14 is a link arm 16. Within chamber 12 there is a cartridge receiving sleeve 17. Sleeve 17 includes bottom guide and support rails 18 (FIG. 2) along its lower sides. Sleeve 17 is substantially open at its lower central portion. At substantially the mid-point of each side wall of sleeve 17 is carried a central fulcrum 20. Fulcrums 20 rides vertically on load down adjustment pins 21 secured to base plate 25. At one side of chamber 12 is cartridge door opening wedge 22 (FIGS. 1 and 2) mounted on a spring clip mounted within sleeve 17. The end of sleeve 17 which is opposed to door 6 includes a cartridge stop 24. Below sleeve 17 is a base plate 25 which supports drive spline mechanism 26 capable of being rotatably driven by a motor, not shown. Drive spline 26 is designed to mate with drive spline 8 of cartridge 4. Connected to the distal end of each link arm 16 at pivot 27 is a one-piece load-down and ejection spring 28 which terminates in distal ejection portion 29. A second one-piece load-down spring 31 is connected to a second link arm 16 at its pivot 27. Springs 28 and 31 are mounted to pass through central fulcrums 20 and guide blocks 30 mounted on base plate 25.

Figure 2:
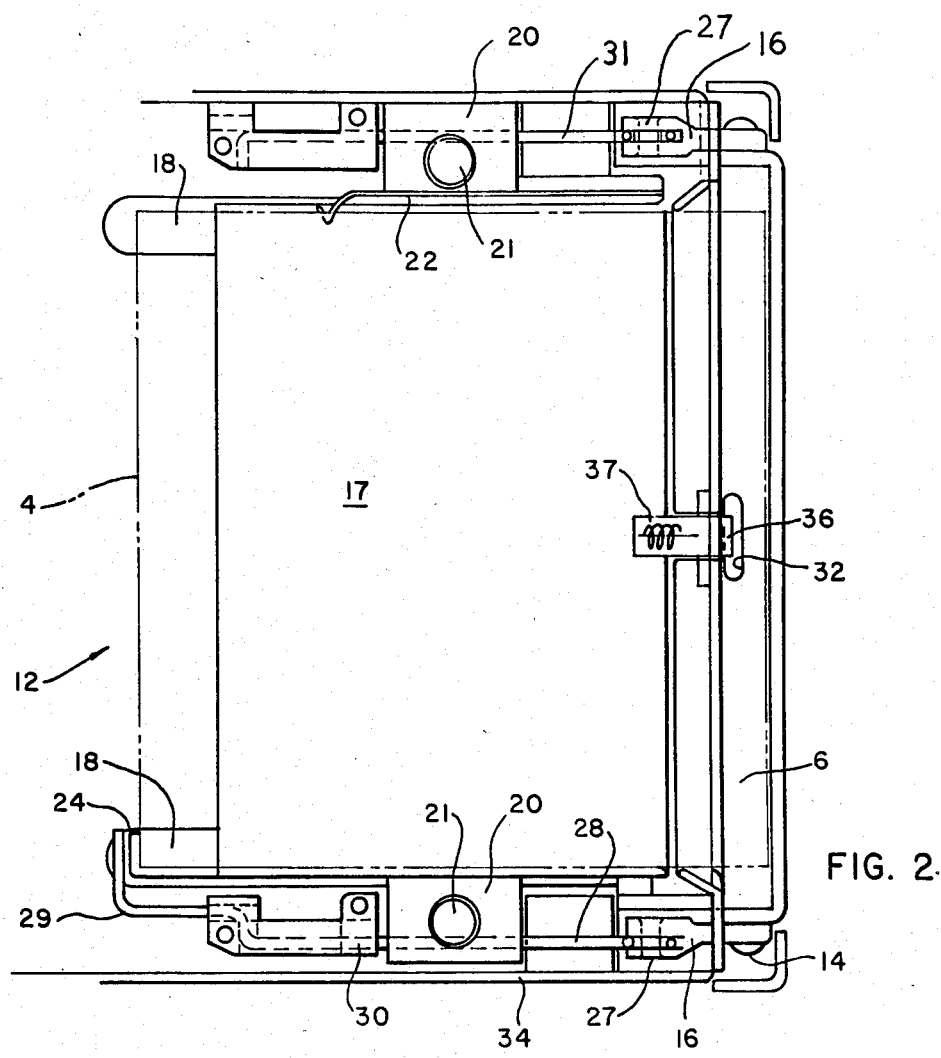
FIG. 2 is a top plan schematic view of the cartridge load and eject mechanism of the present invention.
Figure 3:
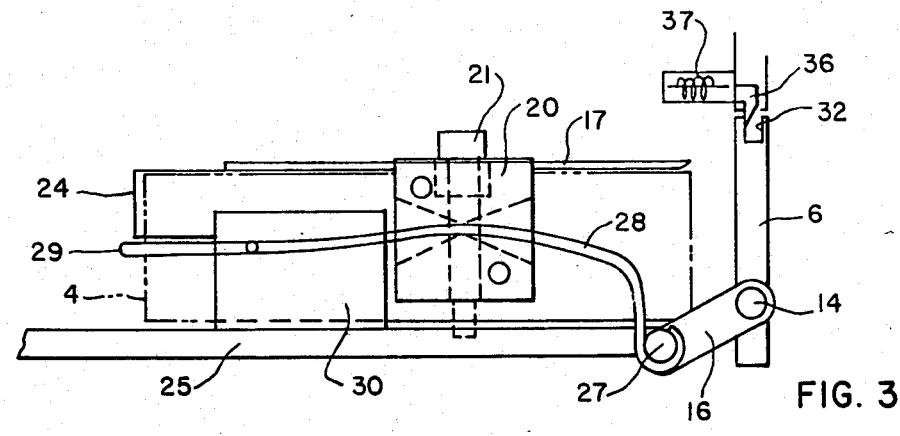
FIGS. 3–6 are a series of schematic side elevational views of the cartridge load and eject mechanism of the present invention showing the load and eject mechanism of FIG. 2 in various stages of being loaded, locked and ejected.

In operation, as shown in FIGS. 2 and 3, a cartridge 4 (in phantom) is loading within sleeve 17 of chamber 12 until its far end bears against stop 24. When so seated, wedge opener 22 bears against a portion of cartridge door 11, as shown in FIGS. 1 and 2 and schematically in FIGS. 7B-7G, causing door 11 to open and expose the end of tape 38. It will also be apparent, by reference to the same FIGS., that when wedge opener 22 bears against cartridge 4 it causes cartridge 4 to seat against the inner surface of the opposed side wall of sleeve 17, with the result that the cartridge is both positioned and stabilized. When door 6 is closed link arm 16 rotates counter-clockwise so that load down springs 28 and 31 connected thereto by pivot 27 is urged back and down within chamber 12 through and against central fulcrum 20. This causes fulcrum 20, attached sleeve 17 and inserted cartridge 4 to ride down on pins 21 so that drive spline 8 of cartridge 4 is in mating contact with drive spline mechanism 26 of the transport system. Operation of the system, including unwinding and rewinding of tape, may then be initiated.

Figure 4:
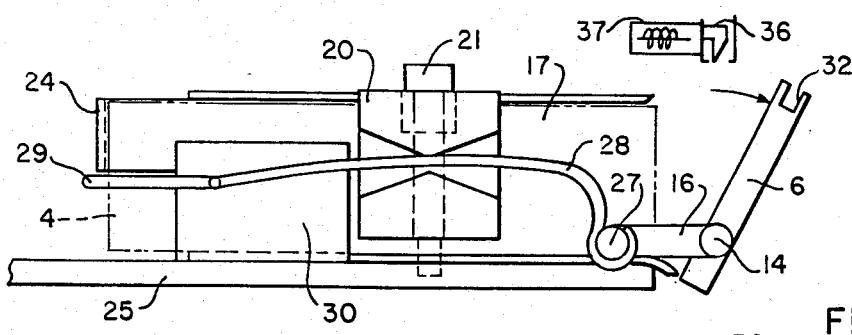
Figure 5:
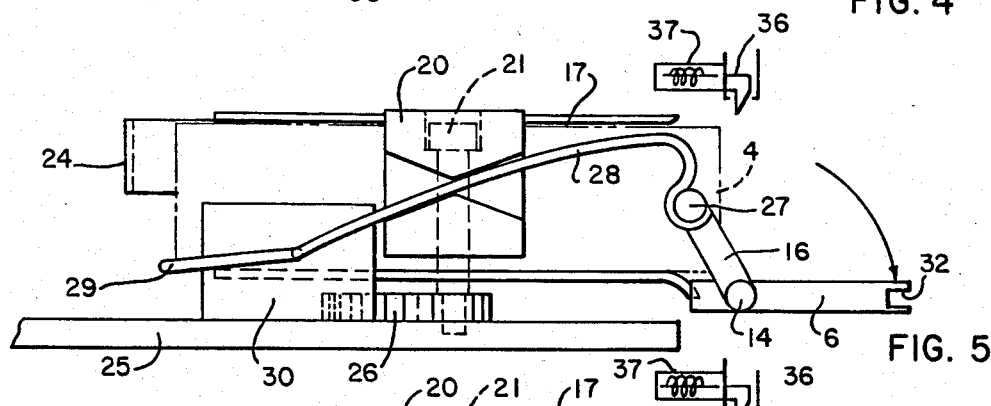
Figure 6:
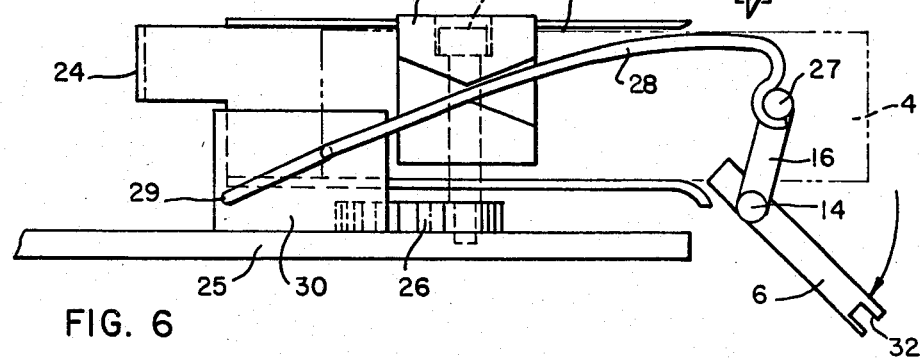
Figure 18:
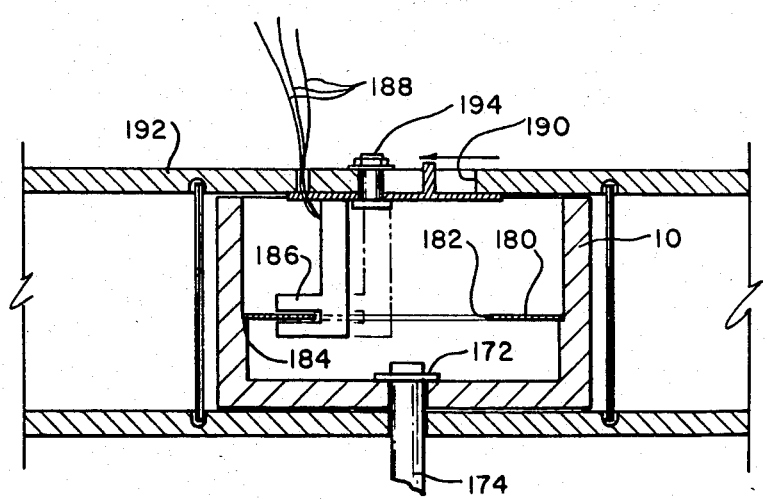
FIG. 18 is a sectional view of the hub and tachometer of the present invention.

As detailed below, when tape use is completed, door 6 is unlatched and caused to open slightly, as shown in FIG. 4, thus allowing an operator to open it, as shown in FIG. 5. This in turn causes the end 29 of spring 28 to be brought to bear against the far end of cartridge 4 causing cartridge 4 to move partially out of the sleeve 17 through open door 6 and removes releasing cartridge door 11 from contact with wedge opener 22, so that cartridge door 11 closes. The cartridge 4 can then be removed from the system. Continued downward rotation of door 6 (FIG. 6) causes link arm 16 to rotate clockwise, which in turn causes the distal end 29 of load-down ejection spring 28 to flex so that it is below the level of cartridge 4. With the system in the configuration shown in FIG. 6, when another cartridge is loaded, it can pass through sleeve 17 until it makes contact with rear stop 24 because it will not make contact with spring end 29. When another cartridge 4 is so loaded and door 6 is closed, the process is reversed and the distal end 29 of spring 28 is flexed to return to the same level as cartridge 4, as shown in FIG. 3. It will be clearly evident by reference to the foregoing description and to FIGS. 2-6 that cartridge 4 is at no time during loading or operation under stress or tension from distal end 29 of spring 28.

In preferred embodiments, door 6 includes a latch receiving opening 32 and system housing 34 carries a mating locking latch 36. Latch 34 is spring-loaded to automatically engage latch 36 when door 36 is closed. Latch 36 may be released manually, or in the preferred embodiment shown, latch 36 is capable of being released by solenoid 37 in response to either machine controls or by the rewinding and parking of tape 38 within cartridge 4. When latch 36 is released door 6 is released and assumes the position shown in FIG. 4.

Automatic Tape Threading

Figure 7A:
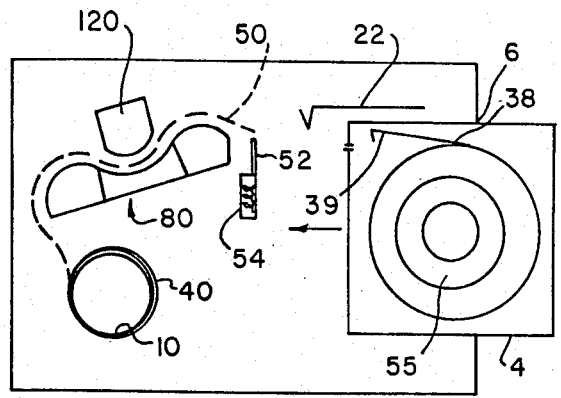
FIGS. 7A–7G are a series of schematic top plan views showing the cartridge loading and tape autothreading system and process of the present invention.
Figure 7D:
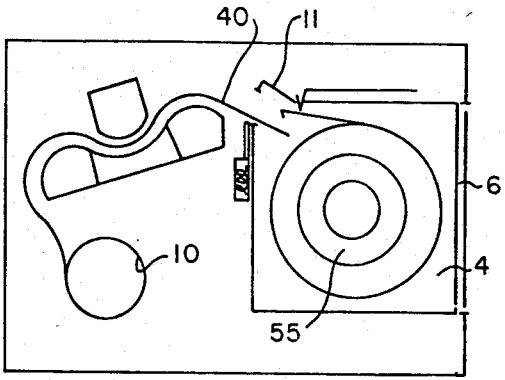

Referring now to FIGS. 7A-7G, and 8, 9 and 10, the operation and details of the automatic tape threading and release practiced by the present invention are set forth. Referring first to FIG. 7A, the elements of the automatic threading operation are shown in top plan schematic detail as cartridge 4 is being loaded into the system through door 6. Within transport 2 there resides tape take-up hub 10 around which semi-rigid leader 40 is normally wound. Hub 10 is indented at 42 (FIG. 9), while leader 40 is cutout at 44 and carries finger receiving openings 46 for purposes described below.

Figure 7B:
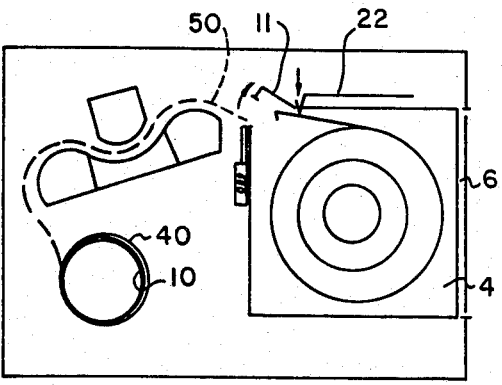
Figure 7E:
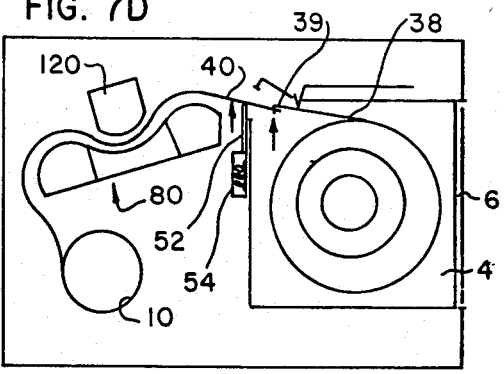
Figure 7C:
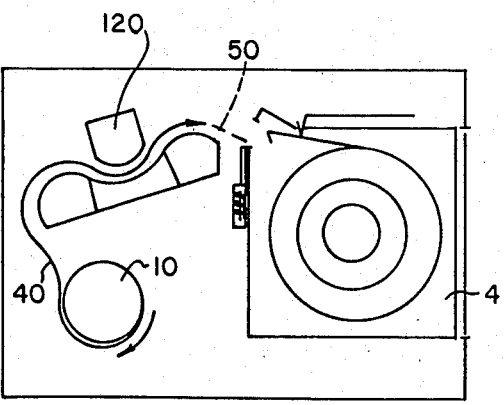
Figure 7F:
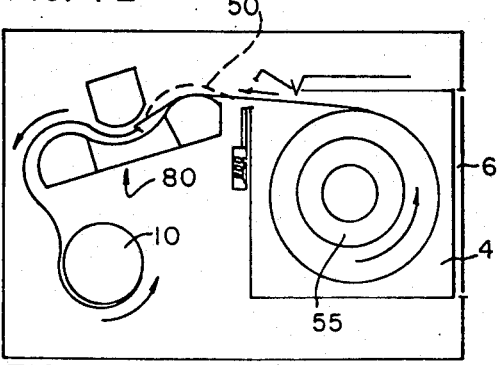
Figure 7G:
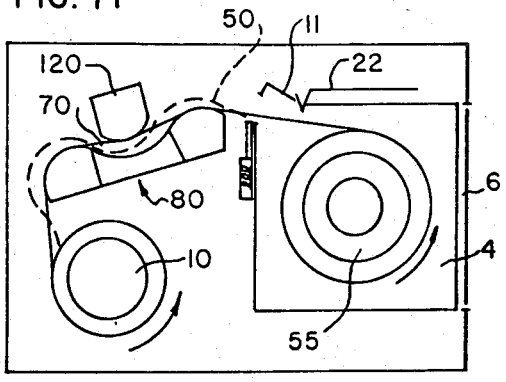

Intermediate cartridge 4 and take-up hub 10 tape threading path 50 which circumnavigates bearing-guide assembly 80 and read/write transducer assembly 120, both of which are discussed in greater detail hereinbelow. A longitudinally movable hammer 52 actuable by solenoid 54 is located in the vicinity of tape threading path 50 terminatus adjacent fully inserted and seated cartridge 4 (FIG. 7B). Cartridge 4 includes reel 55 around which a length of tape 38 carrying finger assembly 39 is wound. As previously described, cartridge 4 includes pivotably openable door 11, while spring clip mounted cartridge door wedge opener 22 is carried within the cartridge receiving portion of the system.

Figure 11:
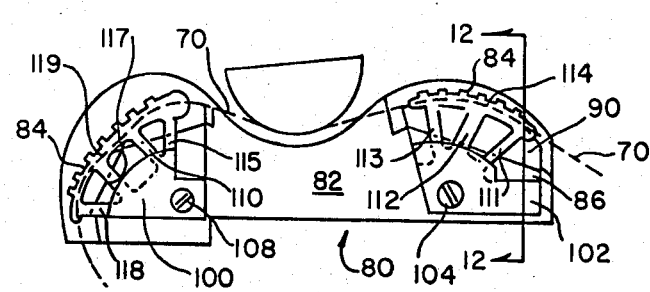
FIG. 11 is a top plan view bf the bearing-guide system of the present invention.

When cartridge 4 is fully inserted into the transport system (FIG. 7B) wedge opener 22 engages cartridge door 11. This causes door 11 to pivot open and expose tape 38 and finger assembly 39 to the transport mechanism. Then rotation of hub 10 is initiated in a clockwise direction (FIG. 7C) causing semi-rigid leader 40 to traverse along threading path 50 between, but without touching, bearing-guide assembly 80 and head system 120. When leader 40 reaches cartridge 4, it enters the cartridge through open door 11 (FIG. 7D) until finger receiving openings 46 in leader 40 are in registration with the fingers of finger assembly 39. At this time, solenoid 54 is activated causing hammer 52 to move longitudinally to strike the inner surface of leader 40 (FIG. 7E), thus causing the end of leader 40 to move into contact with fingers 39 with the result that openings 46 in leader 40 are passed over fingers 39. Then, due to the relative size, orientation and location of fingers 39 and holes 46, the stiffness of leader 40, and the tension which exists between tape 38 and leader 40, fingers 39 and holes 46 will normally remain connected. Subsequently take-up hub 10 and reel 55 begin simultaneous, matched, counter-clockwise rotation (FIGS. 7F and 7G) until leader 40 is completely rewound on hub 10. Attention is directed to the fact that tape 39 is of less width than the height of threading path 50 (FIGS. 8 and 9) so that tape 38 follows a path 70 (FIG. 11) different from threading path 50. Tape path 70 causes tape 38 to ride against bearing-guide assembly 80 and transducer assembly 120.

As previously noted, in preferred embodiments hub 10 includes an indentation 42 in its outer cylindrical surface. It is now seen that indentation 42 substantially matches the dimensions of finger assembly 39. In a similar manner cutout 44 in leader 40 also substantially matches the dimensions of the finger assembly 39 and is an equal linear distance from both leader holes 48 and hub indentation 42, which distance is substantially equal to the circumference of hub 10. In preferred embodiments the linear distance from take-up hub 10 to cartridge 4 along threading path 50 is slightly less than two times the circumference of hub 10. Since the length of leader 40 is about twice the circumference of hub 10, when leader 40 is fully extended it can reach to and within cartridge 4, and when leader 40 is fully wound on hub 10 it makes only about two wraps on the hub. Other hub circumference, threading path, leader length multiples may be used.

Such matching of hub circumference, threading path and leader length provides an easy-to-use mechanism in which substantially full extension of leader 40 allows both tape connection and disconnection (discussed below). When leader 40 is wound on hub 10 with tape 38 attached to it, finger mechanism 39 passes through cutout 44 and into hub indentation 42 to provide a smooth tape winding surface on hub 10.

Figure 10:
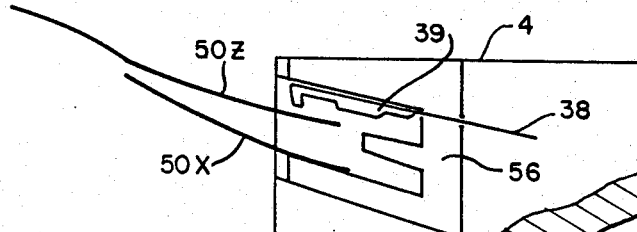
FIG. 10 is a schematic elevational view detailing the paths for the leader and tape at the tape cartridge.
Figure 8:
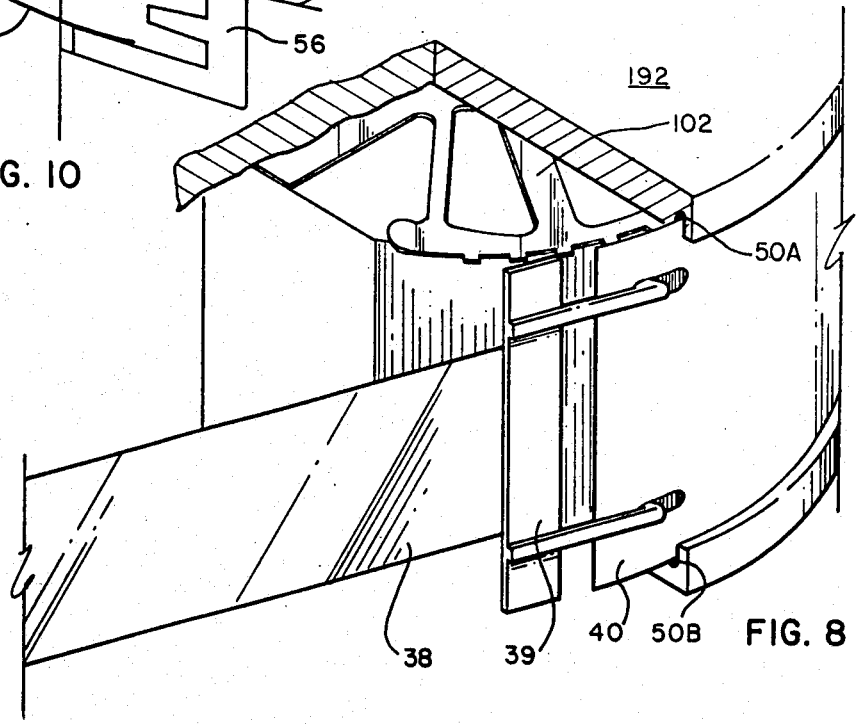
FIG. 8 is an enlarged detailed perspective view showing a magnetic tape connected to an autothreading leader as it travels along the threading path, which is broken away, in the vicinity of a bearing-guide assembly.

Tape 38 is rewound into cartridge 4 by a substantially similar, but slightly different reversal of the steps illustrated in FIGS. 7A through 7G. Attention is directed to FIG. 10 at which two leader paths 50X and 50Z are shown. Paths 50X and 50Z are at the termination of path 50 adjacent cartridge 4. Path 50X is the path which semi-rigid leader 40 will normally follow as it is "pushed" by hub 10 to advance into cartridge 4 without any tension on leader 40. However, during rewinding tape 38 exerts pull and tension on leader 40, thus causing leader 40 to enter path 50Z. Due to the slightly different angle which leader 40 takes with regard to finger assembly 39 along path 50Z, once tape 38 and finger assembly 39 are returned to cartridge 4, stopped, and parked in the cartridge at ramp 56, additional forward motion of leader 40 then causes coupling holes 46 to disengage from fingers 39. Then, due to the separation between leader 40 and fingers 39 due to path 50Z, leader 40 and fingers 39 will not re-engage without some additional action occurring. Thus, after rewinding and separation of tape 38 and leader 40 in the cartridge, counter-clockwise rotation of hub 10 will then cause leader 40 to be withdrawn from cartridge 4 without finger assembly and tape 38. This will, in preferred embodiments cause triggering of a processor (not shown) to cause unlatching of door 6 by solenoid 37 through an electrical connection thereto from the processor, and thus allow the removal of cartridge 4 from the transport system.

Tape Guide and Bearing Assembly

In a space limited, high performance tape transport system, such as that of the present invention, many physical characteristics and factors concerning both the system and the medium must be considered, and matched in the provision of a functional and reliable system. Key among these considerations are the bearing-guide assembly over which the tape will travel in the vicinity of the magnetic transducer. Details of the preferred guide assembly 80 of the present invention are set forth in FIGS. 1, 8 and 11-14.

Figure 12:
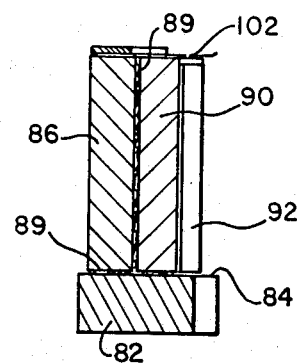
FIG. 12 is a sectional view taken along line 12—12 of FIG. 11.
Figure 13:
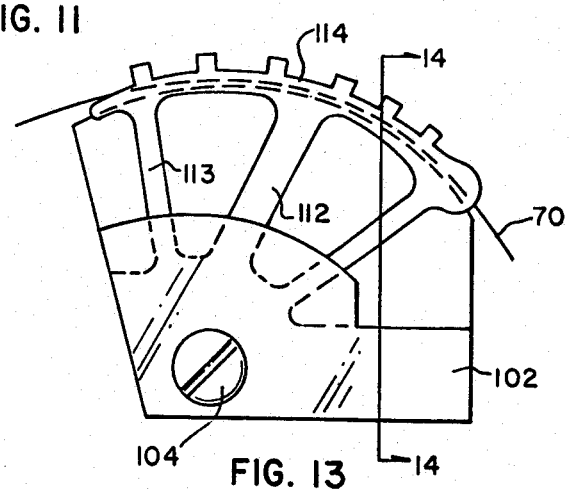
FIG. 13 is an enlarged top plan view of a portion of the bearing-guide of the present invention.
Figure 14:
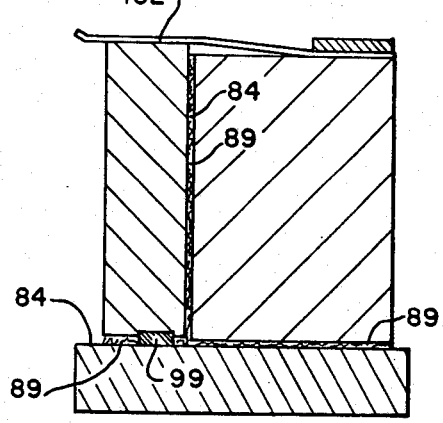
FIG. 14 is a sectional view taken along line 14—14 of FIG. 13.

First, referring to FIG. 1 it is seen that tape bearing guide assembly 80 is comprised of a support plate 82 including flat tape reference surfaces 84 to which bearing-guide support blocks 86 and 88, respectively are bonded, for example, with epoxy 89 (FIGS. 12 and 14). Continuous bearing-guide element 90 is in turn bonded to bearing support block 86 to provide tape bearing-guiding surface 92, while a pair of tape bearing-guide elements 94 and 96 are bonded to support block 88 to provide a pair of adjacent tape bearing-guide surfaces 98 and 100, respectively. Compliant edge guide 102 is secured in overlapping relation to bearing-guide surface 92 at the top of support block 86 and bearing-guide 90 by means of bolt 104 and a clamp 105. Compliant edge guide 106 is secured in overlapping relation to tape bearing-guide surfaces 98 and 100 at the top of support block 88 and bearing-guides 94 and 96 by means of bolt 108 and a clamp 109. The entire tape guide and bearing assembly 80 is secured to transport base plate deck 25 by bolt 110 and by additional bolts, not shown.

The foregoing structure provides the bearing and guiding characteristics for tape at a relatively low cost, and is relatively easy to manufacture. Support structure 82, including reference surfaces 84, are preferably made of dense, smooth, hard material, capable of conducting away static charge, and must by parallel to deck 25 and flat, particularly at reference surfaces 84. Materials of choice include hard anodized aluminum and metals which are coated with hard material such as plasma coated ceramic. Surfaces 92, 98 and 100 of bearing-guides elements 90, 94 and 96 are designed to provide hydrodynamic bearing to tape 38 when it is in longitudinal motion, with a tape to bearing separation of at least 20 microinches larger than the common asperities and debris on the tape. The arc radius of bearing-guide surfaces 92, 98 and 100 are selected to be equal to or less than the width of tape 38, and are finished to a surface finish commensurate with a small separation air bearing. The height of bearing-guides 90, 94 and 96 are selected to be equal to, or as much as one mil. (0.001 in.) less than the minimum width of the tape.

Adjacent bearing-guides 94 and 96 are located and designed to provide tangent contact to tape 38 at surfaces 98 and 100, respectively, at points at which the tape is tensioned or moving between them. Each bearing-guide surface 98 and 100 is designed to have contact with a length of tape, at any given moment, which is less than or equal to the width of the tape.

Bearing-guide elements 90, 94 and 96 will be made of material which is hard, non-porous, non-wettable by the tape, and capable of conducting away static charge. One material of choice for bearing-guide elements 90, 94 and 96 is a hot pressed mixture of aluminum oxide-titanium carbide.

Compliant edge guides 102 and 106 are formed from thin webs of non-magnetic spring material. They are designed to overlap the entire surface 92 and 98 of bearing-guide element 90 and the entire tangential bearing-guide portion of tape bearing-guide surfaces 98 and 100. Compliant guides 102 and 106 provide downward force on the upper edge of tape 38 which in turn serves to move and maintain the lower edge of tape 38 against reference surfaces 84. It will be seen that compliant guide 102 includes three arms 111, 112 and 113 connected by band 114, while compliant guide 106 includes four arms 115, 116 117 and 118 connected by band 119. Where a shim 99 is used to adjust the separation of guides 102 and 106 from the reference surface 84, as described below, arms 112 and 117 are constructed 20-25% stiffer than the other arms to supply a greater guiding force in the region where the tape comes from the supply reel or hub to the bearing-guide system. Thus, should any misalignment of the tape tend to exist from supply cartridge 4 to bearing-guide 90, or between take-up hub 10 and bearing-guide 96, as the tape passes between the compliant guides 102 or 106 and the reference surfaces 84, it is brought into proper alignment for accurate inter-action with transducer head 122 in head positioning system 120. Furthermore, this is accomplished by deforming compliant guides 102 and 106 to conform to upper tape edge variations, rather than by deforming the tape. The undersurface portions of compliant guides 102 and 106 which come into contact with tape edges may be coated with a thin layer of hard material to reduce wear, such as non-magnetic electroless nickel or plasma deposited ceramic. Such coatings should not increase stiffness by more than 20%.

The geometry of the bearing-guide structure is such that the portion of compliant guide 102 on bearing-guide 94 which is closest to cartridge 4, and the portion of compliant guide 106 on bearing-guide 96 which is closest to take-up hub 10 are slightly further separated from reference surfaces 84 than is the rest of the compliant guide structures, with that separation gradually decreasing until it is no more than 1 mil less than the tape width. This structure provides for a gradual guiding and realignment of tape which may be misaligned as it moves from cartridge 4 or hub 10 towards head positioning structure 120. This variation in separation is most easily accomplished by placing a shim 99 of the desired height between the appropriate portion of blocks 86 and 88 and support plate 82.

Head Positioning System

Head positioning system 120, set forth in FIG. 1 in rear perspective is set forth in additional detail in FIGS. 15, 16 and 17. Head system 120, including magnetic read/write head 122 is secured within opening 124 of base plate 25 using a plurality of bolts, e.g. 126 through cross-strut 120. When so located head 122 intercepts and interacts with tape 38, as shown diagramatically in FIG. 7G.

As the system of the present invention is small, but is intended for high performance use, head system 120 must be provided as a compact, small volume, reliable and accurate package. In preferred embodiments, undesired or extraneous movement of head 122 across the width of tape 38 will cause data errors due to cross-talk between adjacent data tracks. Furthermore, rotation of the head will reduce the signal strength of data during recording, and/or will similarly reduce the strength of the signal read.

In order to provide head positioning system 120 in a small, stable, accurate configuration, support structure 130 to which cross-strut 128 is secured is provided. Both cross-strut 128 and support 130 are made of strong, non-magnetic material, such as aluminum or reinforced plastic, which has been made to provide a stable vertical connection for head 122 to the system. Support 130 includes a base portion 132 and a top portion 134 connected in the form of a C by leg 136. Cylindrical shaft 138 is fixed in perpendicular relation between base 132 and top 134. A second cylindrical shaft 140 is rotatably mounted in perpendicular relation between base 132 and top 134. Rotatable shaft 140 terminates in an integral ball 142 at its lower end. Precise, angular rotation of shaft 140 is assured by seating ball 142 in angled conical socket 144 in base 132, while the upper body of shaft 140 is secured for rotation within wedge shaped clamp 146 of top 134 or a screw through the shaft 140. The azimuth of shaft 140, and therefore of head 122 can be adjusted by placing shims, not shown, between the shaft 140 and the shaft mounting surface at whichever face or faces will cause the required adjustment.

Stepping or linear actuator motor 148 is secured to the vertical portion of base 132 by means of bolts 150. Stepping motor 148 drives lead screw shaft 154 or a linear actuation shaft through an opening in base 132. Head 122 is carried by head carriage 152 which includes an internal nut 156 for the lead screw shaft (on a locking nut, for the linear actuator shaft) through which lead screw shaft 154 is threaded. Loading spring 157 is provided around shaft 154 intermediate the top of base 132 and the bottom of carriage 152 in order to provide stability between carriage 152 and base 132. Such a load spring could also be placed around shafts 138 and 140. Coupler 158 connected to carriage 152 is slidably mounted on fixed shaft 138. Spring 159 within coupler 158 terminates at one end against carriage 152, and at the other end in nose 160 resting against shaft 138. This coupler arrangement provides stable loading at the side of carriage 152 as it moves up and down within support 130.

To maintain precise control over the perpendicular location of head 122 carried by head carriage 152, wear of shaft 154 and nut 156 can be compensated. Wear compensation is accomplished by providing stop 161 having a known location on support 130. By periodically driving carriage 152 against stop 161 to locate the position of carriage 152 the resulting information can be used to calculate a new reference point.

Detent 162 is fixed to support 130 by mounting pin 164 and spring arm 166. Rack 168, including a plurality of closely spaced v-shaped grooves 169 is mounted on head carriage 152. The force of detent 162 against a groove 169 of rack 168 due to the strength of spring 166 is sufficient to secure head carriage 152, and thus head 122, stable against unwanted perpendicular movement. Solenoid 170 supported by top 134, is located to strike spring arm 166 when actuated. When solenoid 170 is caused to strike spring arm 166, it causes detent 162 to disengage from rack 168 to allow head carriage 152 and head 132 to be moved perpendicularly. When it is desired to move head carriage 152, solenoid 170 is activated and stepping motor 148 is actuated to cause lead screw shaft 154 to rotate a predetermined number of turns within nut 156 to move carriage 154 and head 122 a given number of steps. This causes head carriage 152 and associated head 122 to move up or down a predetermined distance. Then, when solenoid 170 is deactivated detent 162 seats within one of the grooves 169 of rack 158 to provide a final precise track location for head 122. For example, where grooves 169 are separated by about 0.0001 inch the stepping motor is only required to locate carriage 152 and head 122 to ±0.003 inch, as the detent will then complete positioning of the carriage and head to within about 250 microinches.

By utilizing this mechanism head 122 can be secured against rotation, and precisely and securely positioned in the desired azimuth. Due to the support and precise positioning provided to head carriage 152 by detent 162 and rack 168 motor 148 need operate with only nominal precision, and since it is required to develop little force, can be quite small, need not be always "on" to hold the carriage in place (this is done by the detent and rack) and will thus generate little heat and require little cooling.

Take-Up Hub

Take-up hub 10 has been discussed in substantial detail, above, with regard to its function in carrying leader 40, of predetermined length, and using that leader to automatically thread tape 38 from cartridge 4 to take-up hub 10. Once tape 38 has been connected to hub 10, then hub 10 serves other functions. The other major function of hub 10 is to move tape 38 longitudinally in two directions by magnetic head 122 to write and read data. In so doing, hub 10 rotates at relatively high speeds and can develop vibrations which can detrimentally effect the systems performance. It has been discovered that such vibrations are dampened by placing one or more ring(s) 172 of energy absorbing material between the drive shaft 174 of the associated motor (not shown) and take-up hub 10, or by bonding such material within the hub. The material used for dampening vibrations is selected in response to the bandwidth of vibrations generated by the system. Materials of choice include rubber and synthetic rubber such as urethane. By simultaneously using rings of different materials or geometry, different frequency bandwidths of vibration can be dampened simultaneously.

The inner portion of hub 10 also provides a location of choice for a tachometer system. This is accomplished by securing tachometer ring 180 having central opening 182 on ledge 184 within hub 10. Light source-sensor 186 and associated wires 188 are connected to slot 190 in cover plate 192 by means of bolt 194. Cover plate 192 is secured at each of its corners to deck 25 by stand-off bolts 196 and connecting bolts 198. As cover plate 192 is secured in place, light source-sensor 186 is initially slid to the right in slot 190. Then, after the cover plate 192 is in place, light source-sensor 180 is slid to the right to slot 190 to bracket tachometer ring 180. This arrangement provides a reliable yet inexpensive means for measuring the speed of revolution of hub 10.

Tape Path

In the dynamics of a small, high performance reel to reel tape transport system, such as that of the present invention, the location of the various elements which the tape traverses, all of which constitute tape path 70, must be compatible. For example, the rotation of reel 55 in cartridge 4 and of hub 10 will generally be in the same direction. However, the rotational speed will not normally be the same. In preferred embodiments, reel and hub 10 are each driven by a separate motor. The length, say 400 feet, and wound thickness of the tape on each is known. The rotational speed of hub 10 is specifically measured by tachometer 180 light source-sensor 186 and its related processor, not shown. A processor, not shown, constantly tracks the wound radius of reel 55 and hub 10 and feeds adjustments back to each drive motor to adjust and control their relative rotational speed, and thus the longitudinal velocity of tape 38 at head 122. This same processor system applies current to the supplying reel creating a torque to control the tension of the tape. This is accomplished by the use of a mathematical model which describes tape path 70, including the wrap angle and friction of the tape with elements in its path, and the required tape tension of the head, and then determines the torque at the supply reel to achieve this tension.

The tape path is also designed to avoid generating torsional and lateral resonances which are either close to each other (within 20%) or to the exciting range of the drive motors and reels. The lateral tape resonance from cartridge 4 to bearing-guide 90, from bearing-guide 90 to head 122, from head 122 to bearing-guides 94, and from bearing-guide 96 to take-up hub 10 must be greater than the torque ripple excitation frequency of the driving motor. There is a critical range of tape lengths which will give tape 38 low lateral forces, and also provide the required high lateral resonances. This is also best achieved using hydrodynamic guide members, such as 90, 94 and 96 which are selected so that tape contact pressure is low for low tape and guide wear and so that bending stresses due to tape stiffness are much less than stress due to tape tension.

It has also been determined that the reel 55 to hub 10 longitudinal lateral frequency must be high enough to have the tape 38 operate as though it were stiff and yet operate in the present desired high tension and velocity stable system. This is controlled by motor and reel inertia between reel 55 and hub 10, and there is a limited range of tape length that will meet this criteria.

It is incidentally noted that the motor housings (not shown) are integral with the lower side of tape base plate 25 for improved heat transfer and better packaging efficiency.

It is thus seen that the present invention teaches a small, high performance magnetic tape transport system for use in recording and reproducing data. As taught, the supply reel for the magnetic tape medium and the tape is carried in a cartridge which is capable of being easily loaded into and removed from the system for storage. In the embodiment taught, means are included for loading, automatically positioning and seating a cartridge in contact with a drive mechanism in the transport, and for ejecting a cartridge therefrom. The systems separate cartridge drive and take-up hub are taught to be driven by their own separate motor system, as required, with the direction and speed of each motor being interrelated.

Automatic threading of the tape is taught using a semi-rigid leader including a coupling portion which is permanently attached to the take-up hub. The to-be-threaded magnetic taped includes a coupling portion which is complimentary with the coupling portion of the leader. The transport system is taught as defining a specific path for the leader to follow from the take-up hub so that it reaches and couples with the tape, and is then rewound on the take-up hub. A different path is followed by the tape after it is threaded, which tape path places the tape in bearing-guiding system contact which provide for low friction and low stiction and acceptable resonance between the tape, the tape bearing-guiding system, the transducer over which the tape traverses and the supply and take-up reels. The system also teaches accurate tape edge guiding without tape edge damage. The speed of rotation of the take-up hub is controlled by a tachometer located in the take-up hub, while the relative speed of both motors is controlled by a servosystem.

Magnetic transducer positioning adjacent the tape path is achieved using an inexpensive magnetic transducer mounted in a support system which precisely positions the head tracks and quickly and accurately moves the head across the tape surface.

While the invention has been particularly shown and described with reference to preferred embodiments thereof, it will be understood by those skilled in the art that the foregoing and other modifications or changes in form and details may be made therein without departing from the spirit and scope of the invention as claimed, except as precluded by the prior art.

What is claimed is:

1. A tape transport device for use with cartridge including a single reel carrying a tape of a given width and having a central drive hub, including in combination a frame; a hub driving mechanism for a cartridge reel drive hub, said hub driving mechanism support by said frame; a base plate supported by said frame; a driven take-up hub having a leader of a given width which is wider than said tape, and a web surface for winding said leader and said tape, said take-up hub supported by said frame; a transducer, said transducer supported by said base plate and located intermediate said cartridge drive hub and said take-up hub, said transducer having transducing surface portions; a first fixed bearing-guide member having curved surface portions, and a second fixed guide-member having curved surface portions, said first and second fixed bearing-guide members supported by said base plate and bracketing said transducer and positioned so that a plane tangent to said curved surface portions of both said bearing-guide members will intersect said transducer behind said transducing surface portions; and a cover plate spaced apart from and substantially parallel to said base plate, said cover plate and said base plate sandwiching said transducer and said first and second fixed bearing-guide members thereinbetween, wherein the improvement comprises:

a substantially continuous sinous tape threading path, of definite length, including structure defining a pair of tracks in said base plate and said cover plate, which tracks from an open channel having a given width which is greater than the width of said tape and less than the width of said leader, said substantially continuous tape threading path being intermediate said cartridge drive hub and said take-up hub and winding past said curved surface portion of said first fixed bearing-guide member without making contact therewith, past said transducer without making contact with said transducing surface portions, and past said curved surface portions of said fixed second bearing-guide without making contact therewith; and tape transducing path of definite length and structure and different from said threading path, said tape transducing path being intermediate said cartridge drive hub and said take-up hub and running substantially tangentially from said cartridge drive hub to said first fixed bearing-guide member, wrapping around and making contact with a portion of said curved surface portions of said first fixed bearing guide member and then running tangentially from said first fixed bearing-guide member to said transducer, wrapping around and making contact with said transducing portions of said transducer and then running tangentially from said transducer to said second fixed bearing-guide member, wrapping around and making contact with a portion of said curved surface portions of said second fixed bearing-guide member, and then running tangentially from said second fixed bearing-guide member to said web of said take-up hub.

2. The define of claim 1 wherein said tracks are grooves in said base plate and said cover plate and wherein said tape threading path is thus defined as a channels between said grooves.

3. The device of claim 2 wherein said leader is semi-flexible and is fixed to the web surface of said takeup hub, said semi-flexible leader being of such length as necessary to be able to substantially traverse the distance from said take-up hub to said cartridge drive hub along said tape threading channel between said base plate groove and said top plate groove, whereby said semi-flexible leader can be caused to extend and withdraw along said tape threading path without contacting said surface portions of said first and second bearing-guide member of said transducing portions of said transducer.

4. The device of claim 3 wherein a magnetic tape cartridge having a single reel, said reel having a central drive hub and carrying magnetic tape wound on said single reel is loaded on said cartridge drive hub, and wherein said magnetic tape has a leading end and mechanical connecting means at said leading end, and wherein said semi-flexible leader has a leading end and means for mechanically connecting to said connecting means of said magnetic tape, said magnetic tape being of lesser width than both said semi-flexible leader and the distance between said base plate groove and said top plate groove, whereby when said semi-flexible leader is wound into said take-up hub along said threading path it draws said magnetic with it, with the result that said magnetic tape follows said tape transducing path rather than said tape threading path.

5. The device of claim 4 wherein said mechanical connecting means on said tape are a pair of hooked fingers and said mechanical connecting means on said semi-flexible leader is a pair of openings located to be registerable with said hooked fingers.

6. The device of claim 5 wherein said fingers extend beyond the edges of said tape and said semi-flexible leader has an opening to register with said finger structure when said leader and tape is wound on said take-up hub, to thus minimize distortion of the wound tape on said take-up hub.

7. The system of claim 1 wherein said surface portions of said bearing-guide members are designed to provide hydrodynamic bearing to tape passing longitudinally over said surface portion.

8. The system of claim 7 wherein said bearing-guide members are located on a reference surface and carry resilient edge guides opposed to said reference surface.

9. The system of claim 8 wherein said resilient edge guides are located progressively closer to said reference surface as said resilient edge guides approach said transducer.

10. The system of claim 7, wherein said bearing-guides are composed of hard, smooth, wear resistant material capable of conducting away a static charge.

* * * * *